(12) United States Patent
Lucot et al.

(10) Patent No.: US 7,770,371 B2
(45) Date of Patent: Aug. 10, 2010

(54) CUTTER HEAD FOR STALK-LIKE HARVESTED CROP WITH A MECHANISM FOR THE SELECTION OF THE LENGTH OF CUT

(75) Inventors: Alain Lucot, Marnay (FR); Raymond Uros, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/423,036

(22) Filed: Apr. 14, 2009

(65) Prior Publication Data

US 2009/0272089 A1 Nov. 5, 2009

(30) Foreign Application Priority Data

Apr. 15, 2008 (DE) .................... 10 2008 019 086

(51) Int. Cl.
*A01D 75/00* (2006.01)
*A01F 29/00* (2006.01)

(52) U.S. Cl. .......................... 56/341; 56/131

(58) Field of Classification Search .......... 56/131, 56/341, 503, 229, 14.5, 504, 505, 364, 16.4 R; 100/88, 94–97, 189; 460/62, 63, 71, 72, 460/78, 107–109, 112
See application file for complete search history.

(56) References Cited

U.S. PATENT DOCUMENTS 6,595,123 B2 * 7/2003 Schrag et al. ............... 100/97
6,910,325 B2 * 6/2005 Viaud ......................... 56/341
7,584,594 B2 * 9/2009 Viaud ......................... 56/364
7,694,504 B1 * 4/2010 Viaud et al. ................. 56/341

FOREIGN PATENT DOCUMENTS

| DE | 43 02 199 C2 | 7/1994 |
| DE | 297 19 754 | 12/1997 |
| DE | 197 07 662 | 8/1998 |
| DE | 198 05 854 C1 | 5/1999 |
| EP | 38 16 204 | 11/1998 |
| EP | 1 584 226 | 10/2005 |

OTHER PUBLICATIONS

European Search Report, Jun. 30, 2009, 4 Pages.

* cited by examiner

*Primary Examiner*—Robert E Pezzuto

(57) ABSTRACT

A cutter head for stalk-like harvested agricultural crop is provided including a number of pivoted knives arranged along side each other. Levers are associated with the knives and can be moved between an operating position in which they retain the knife associated with it in an active position, and a non-operating position in which they are preloaded by springs. A control shaft allows for the selection of the length of cut. An actuator, that is independent of the control shaft can move between a first position, in which all levers are brought into the non-operating position and a second position, in which the levers can reach the operating position and the control shaft retains the levers of the knives not selected in each case in the non-operating position.

13 Claims, 6 Drawing Sheets

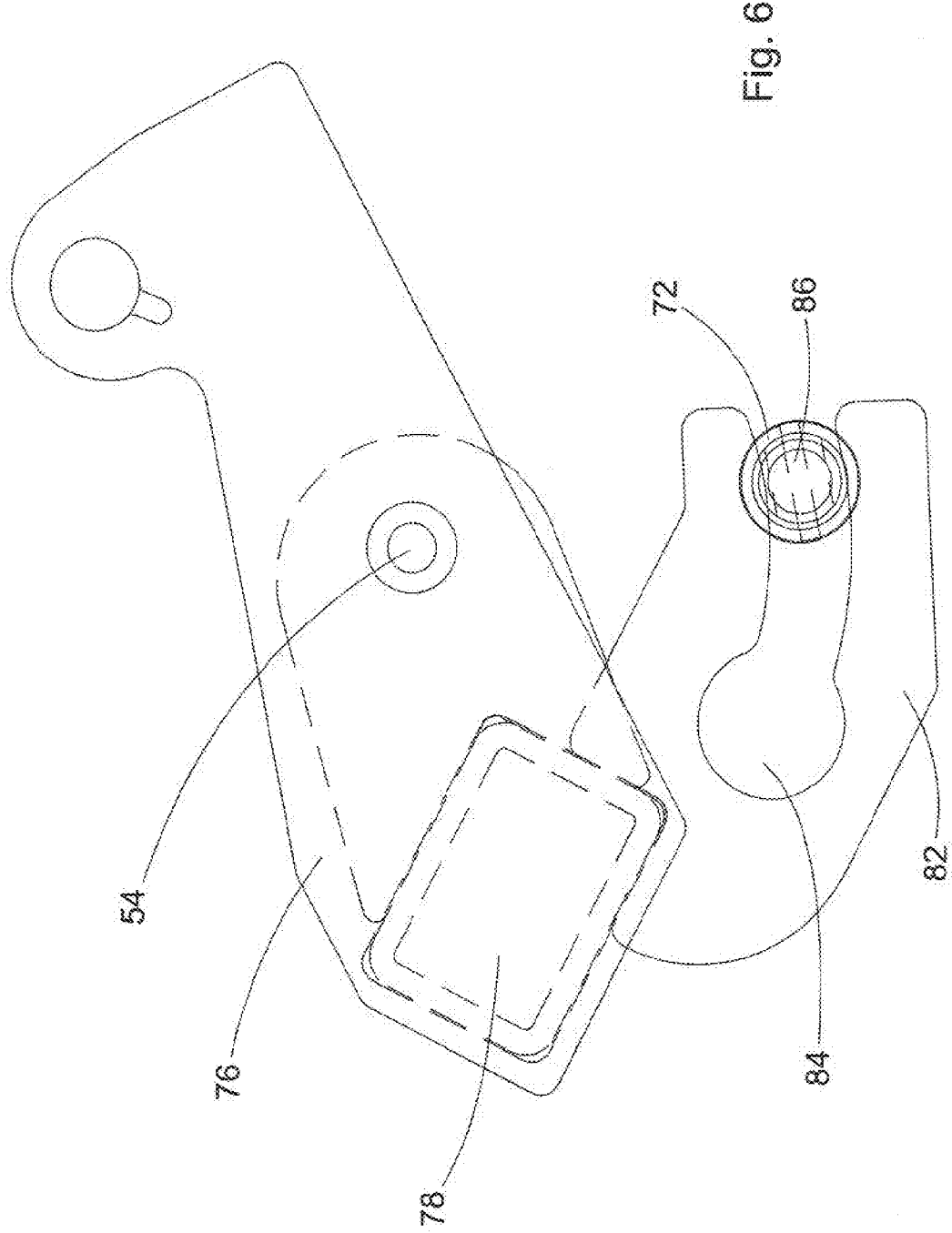

CUTTER HEAD FOR STALK-LIKE HARVESTED CROP WITH A MECHANISM FOR THE SELECTION OF THE LENGTH OF CUT

FIELD OF THE INVENTION

The invention concerns a cutter head for stalk-like harvested crop, the cutter head having a number of knives that are arranged alongside each other within a channel through which harvested crop can flow. The knives are connected in joints so as to pivot about a pivot axis arranged transverse to the channel. Levers are associated with the knives that are supported, free to rotate, about an axis parallel to the pivot axis and can be moved between an operating position in which they extend into the channel and in which the associated knife is retained in an active position and an inactive position, in which they do not retain the knife in the active position. Springs are associated with the levers that pre-load the associated levers into the operating position. A control shaft interacting with the levers extending parallel to the pivot axis interacting with these for the selection for the length of cut and can be selected for a partial number of knives to be brought into the active position.

BACKGROUND OF THE INVENTION

In stalk-like harvested crop machines, such as balers and self-loading forage boxes, there is, in many cases, a need for cutting the harvested crop into shorter pieces before storing it. For this purpose, cutter heads are used that have a number of knives arranged side-by-side alongside each other extending into a channel in which the harvested crop is conveyed. In order to change the length of cut the number of knives, in each case, are moved into the channel or out of it.

DE 38 16 204 A describes a round baler with a cutter head, in which the knives, arranged in a row, are connected, so as to pivot, around their upstream ends about a horizontal axis, in which the harvested crop is to be conveyed into the baling chambers. The knives include a recess into which a first roll engages with knives in the active position, that is connected in joints to a first arm of a lever associated with the knife, that is supported, so as to rotate, about an axis parallel to the pivot axis. A spring pre-loads each of the first arms of the lever with the roll in the direction of the knife. The lever includes a second arm with a further roll. A control shaft extending parallel to the axis is equipped with several curved disks that interact with the further rolls and are able to bring the levers into a non-operating position, in which the first roll is spaced at a distance from the recess at the back of the knife and the knife is pivoted out of the conveying channel that is, it is in the inactive position. If the curved disk does not bring the lever into the non-operating position, then the spring draws the associated knife into the operating position, in which it extends into the conveying channel and cuts the harvested crop. In case of an overload, for example, due to a foreign object taken up, the first roll is forced out of the recess against the force of the spring and the knife reaches the inactive position.

Accordingly, the control shaft is used to bring the levers of the knives that are to be brought into the inactive position against the force of the spring associated with the levers. Due to the high forces a reduction gearbox is required in order to be able to rotate the control shaft manually. Alternatively, an actuator, actuated by external forces is used for this purpose in the form of a hydraulic cylinder. A disadvantage here in particular is seen in the fact that the forces acting on the curved disk will require a very stable and therefore costly dimensioning of the curved disk of the control shaft in order to avoid premature wear.

SUMMARY OF THE INVENTION

The problem underlying the invention is seen in the need to make available a mechanism, improved over the state of the art, for the selection of the length of cut of a cutter head for stalk-like harvested crop that avoids the aforementioned disadvantage.

The cutter head includes a number of knives that are arranged alongside each other in a direction extending over the width of the channel that is extending transverse to the direction of flow of the harvested crop. The knives are pivoted about a pivot axis extending in the direction transverse to the channel, as a rule, in a frame of a harvesting machine equipped with the cutter head. Each knife is associated with a lever that is supported in bearings, free to pivot, about an axis extending parallel to the pivot axis. The lever can be moved between an operating position, in which it holds the associated knife in an active position, in which it extends into the channel, in order to cut the harvested crop, and a non-operating position. In the latter, it does not hold the knife in the active position, so that it reaches an inactive position under the effect of the force of gravity and/or the force of the incoming flow of the harvested crop, in which it does not extend into the channel. The levers are preloaded into the operating position by springs associated with the lever. An actuator, actuated by external forces, is present with which all levers can be brought into the non-operating position against the force of all springs, when the actuator is brought into its first position. A control shaft separate from the actuator is used for the selection of various partial numbers of knives that are to be brought into an active position and thereby used for the selection for the length of cut of the harvested crop. Obviously it is also possible to bring all knives or no knives at all into the active position. The control shaft is independent of the actuator and is used only to retain the lever of the knives not to be brought into the active position in the non-operating position. As soon as the actuator is brought into its second position, in which it permits a free movement of the lever in its operating position under the force of the springs, only the selected knives to be brought into the active position not being held by the control shaft, the lever is brought by the springs into the operating position and pivoted about a pivot axis in the active position. On the other hand, the other levers remain in the inactive position, in which they are retained by the control shaft.

Accordingly, the invention proposes to separate the functions of the operation of the lever between the operating position and the non-operating position on the one hand and the selection of the knives on the other hand. The first problem is taken over by the actuator, while the control shaft is used for the second problem. In this way the control shaft can be configured relatively simply and at low cost and is less prone to wear as it would be in the state of the art.

In a preferred embodiment of the invention the control shaft can be rotated about its longitudinal axis for the selection of the length of cut. It would also be conceivable to configure the control shaft alternatively or in addition for the selection for the length of cut to slide in its longitudinal direction.

The control shaft can appropriately be moved only when the levers are in their non-operating position. Thereby damage is avoided that could occur if the control shaft is moved before the actuator is brought into the first position. Accordingly one recommendation would be to provide a coupling between the actuator and the control shaft that makes it possible to move the control shaft only when the levers are brought into the non-operating position. In the case of a control shaft actuated by external forces, an electronic control arrangement could be coupled with the actuator that would permit a movement of the control shaft only when actuator is in the first position. If the control shaft is actuated manually this coupling can be configured mechanically, particularly if the control shaft is coupled to the actuator and includes a first part and a second part. The first part includes the control shaft as long as the actuator is in the first position, but does not limit its movement. The second part includes the control shaft when the actuator is in the second position and then prevents its movement.

The levers preferably include two arms arranged on opposite sides of the axis, to which the levers are connected in joints so as to pivot. The first arm interacted with the knife, while the second arm interacts with the actuator. The control shaft may interact with the first arm or the second arm, where the latter is preferred for reasons of space.

The control shafts preferably includes flattened areas that interact with complementary recesses in the levers. Accordingly, the recesses include an opening in which the control shaft is located when the lever is in the non-operating position and a penetration leading to the outside that is narrower than the penetration and through which the control shaft can penetrate only when it is in a position that corresponds to the active position of the associated knife.

The cutter head, according to the invention, can be applied to any desired harvesting machine for the harvest of stalk-like crop. Examples are self-loading forage boxes and balers for cylindrical or rectangular bales.

BRIEF DESCRIPTION OF THE DRAWINGS

The preferred embodiments of the invention will be described below with reference to the accompanying drawings wherein.

DESCRIPTION OF THE PREFERRED EMBODIMENT

Figure 1:
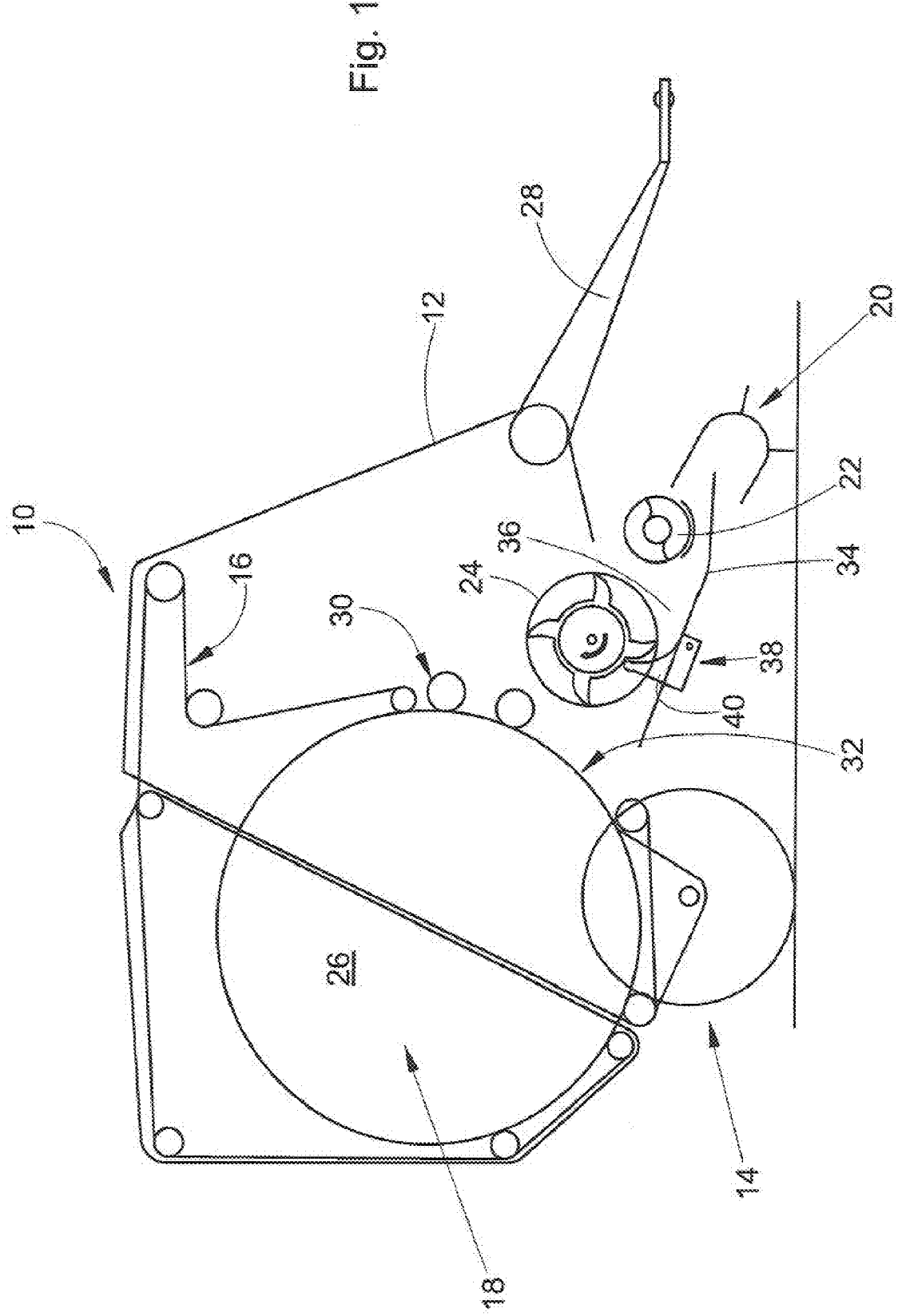
FIG. 1 is a schematic side view of a rotobaler with a cutter head.

A baler 10, shown in FIG. 1 is provided with a superstructure 12, a chassis 14, baling elements 16, a baling chamber 18, a take-up arrangement 20, a transverse conveyor 22 and a conveyor rotor 24. The baler 10 is shown here representative of every configuration of a baler, that is as a rotobaler with a fixed or variable volume of its baling chamber surrounded by belts, rollers or chains., as slab baler, in agriculture, in industry or trade, etc. In the usual case, such a baler 10 is towed across a field in order to take up stalk-like harvest crop, such as straw, hay or silage from the ground in order to conduct it to the baling chamber 18 of a self loading forage box in order, for example, to build a bale 26 or to store the harvested crop and to unload it at a desired location. The superstructure 12 includes walls and struts that rest on the chassis 14 that can be coupled by means of a tow-bar 28 to a vehicle, for example, an agricultural tractor. The chassis 14 conventionally consists of an axle and wheels.

The baling elements 16, in the embodiment shown, are formed by belts that are conducted over rolls 30 or combined with these. These baling elements 16 leave a space in order to form an inlet 32 for the harvested crop in the baling chamber 18. The baling elements 16 may circulate in either direction. In this configuration the baling chamber 18 is shown with a constant size but may be configured in any other way desired.

The take-up 20, a so called pick-up, takes up harvested crop from the ground that has been deposited in a swath of varying volume and size and is conducted to a narrower width in its path to the baling chamber 18. The pick-up 20 operates in an overshot manner. The harvested crop taken up by it is conducted together by means of the transverse conveyor 22, which may be a transverse screw conveyor composed of a central tube and coils wrapped around the central tube. The transverse conveyor 22 delivers the harvested crop to the conveyor rotor 24, which operates on an undershot basis, that is provided with a central tube with drivers attached to it and conveys it to the inlet 32. A rigid wall 34 is located underneath the transverse conveyor 22 and the conveyor rotor 24, along whose upper side the harvested crop is conveyed. Accordingly a channel 36 is formed between the wall 34 and the conveyor rotor 24, through which the harvested crop is conveyed.

The knives 40 of a cutter head 38 can be inserted into the channel 36, in order to cut the harvested crop into smaller pieces. The cutter head 38 includes several knives 40 arranged alongside each other, transverse to the direction of the flow of the harvested crop, of which a number, a partial number, or no knives can be arranged in the channel 36. The associated mechanism is shown in FIGS. 2 through 6.

Figure 2:
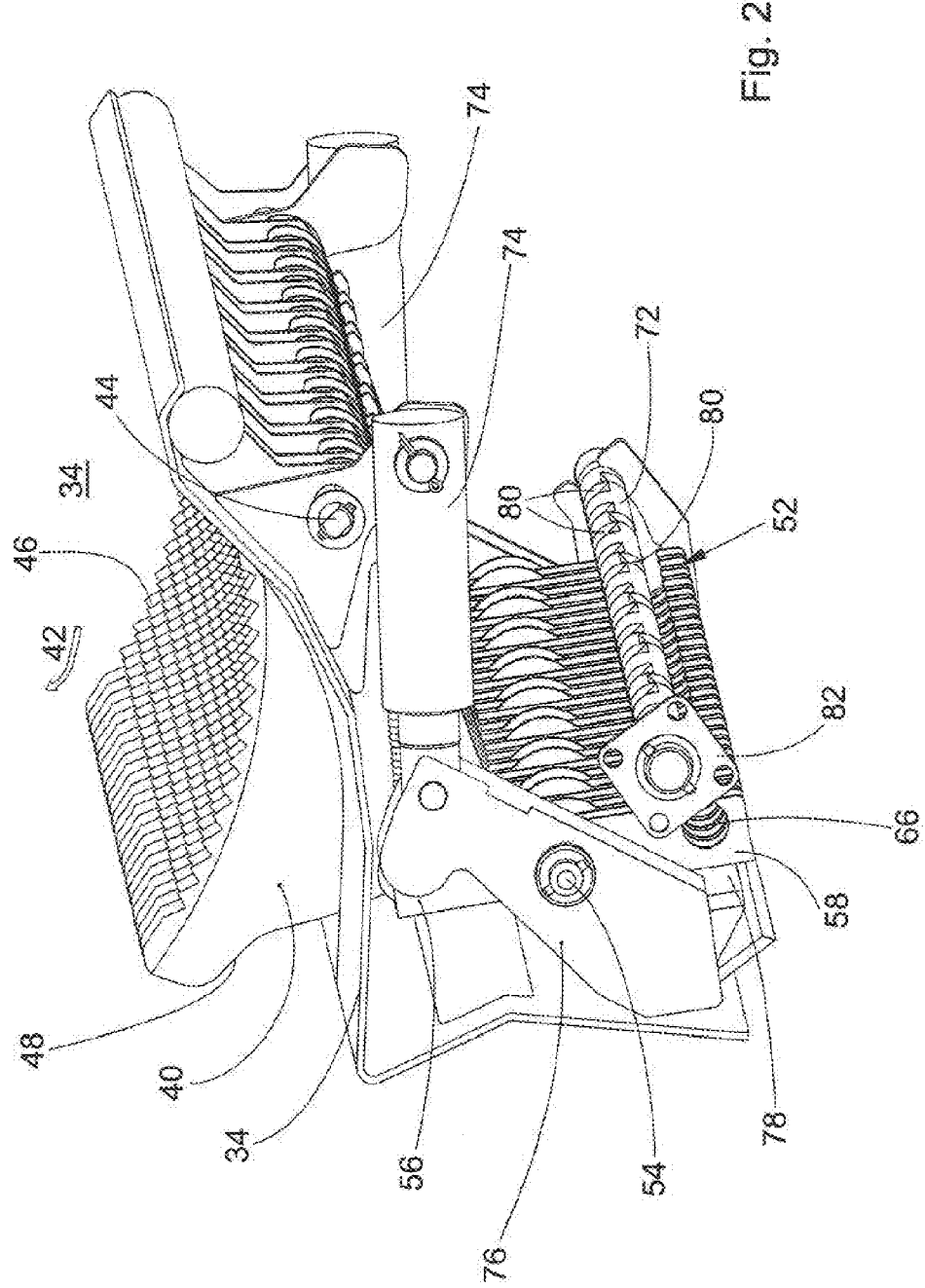
FIG. 2 is a perspective view of the cutter head.

FIG. 2 shows the cutter head in a situation, in which all knives 40 are in the active position, i.e. extending into the channel. The knives 40 are supported at their upstream end, free to pivot, about a pivot axis 44 on the frame or the superstructure of the baler 10, relative to the direction of flow of the harvested crop as indicated by the arrow 42. The pivot axis 44 extends horizontally and transverse to the forward operating direction of the baler 10 and hence transverse to the channel 36. Each knife 40, is generally triangular in its total form and includes a sharpened, toothed cutting edge at its upper side 46, that extends into the channel 36, in order to cut the harvested crop. At the lower end of a rear edge 48 the knife 40 includes a recess 50 (see FIGS. 3 through 5).

Figure 3:
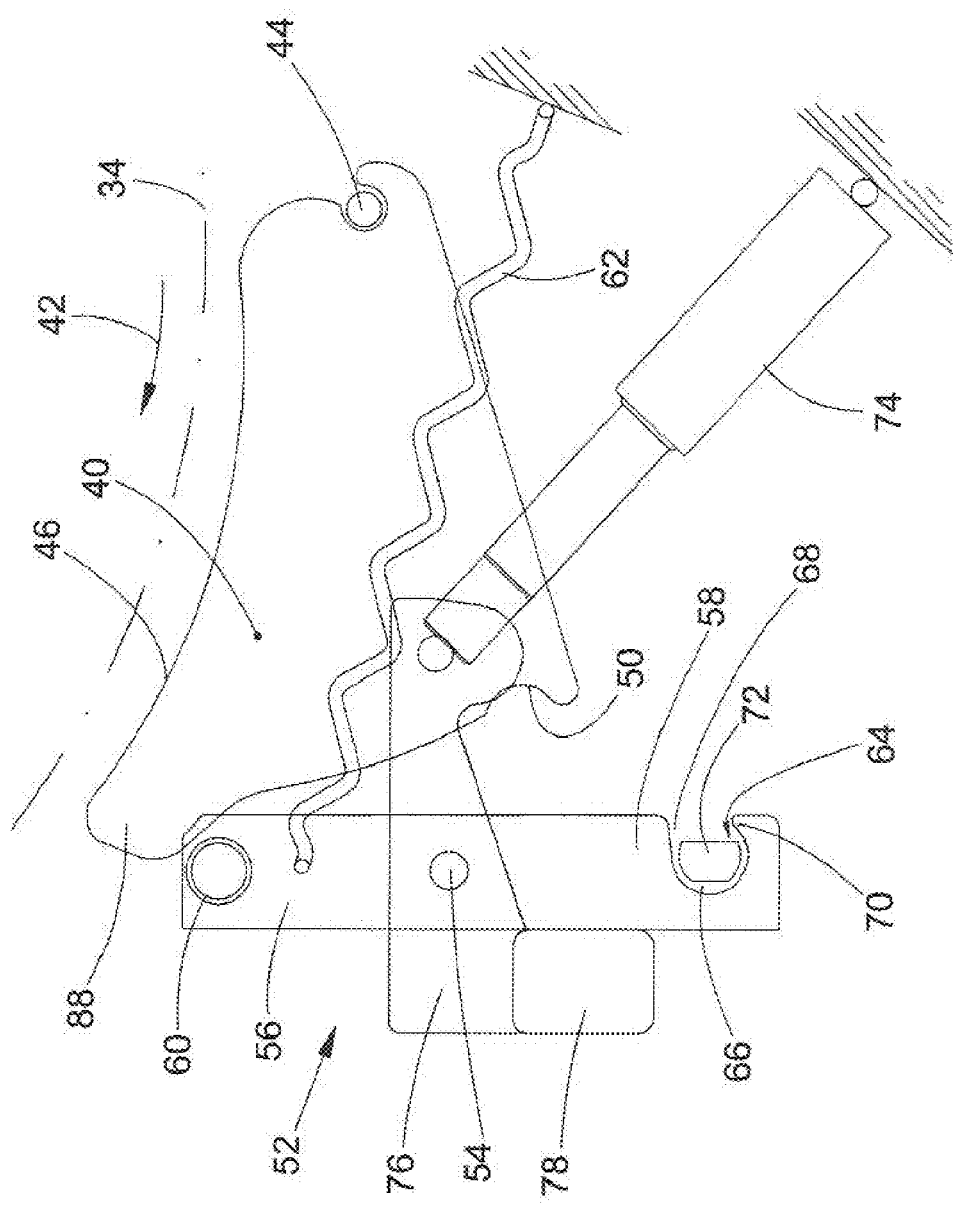
FIG. 3 is a schematic side view of a knife of the cutter head in an active position with the associated lever, the control shaft and an actuator in the first position, that makes possible a rotation of the control shaft.
Figure 4:
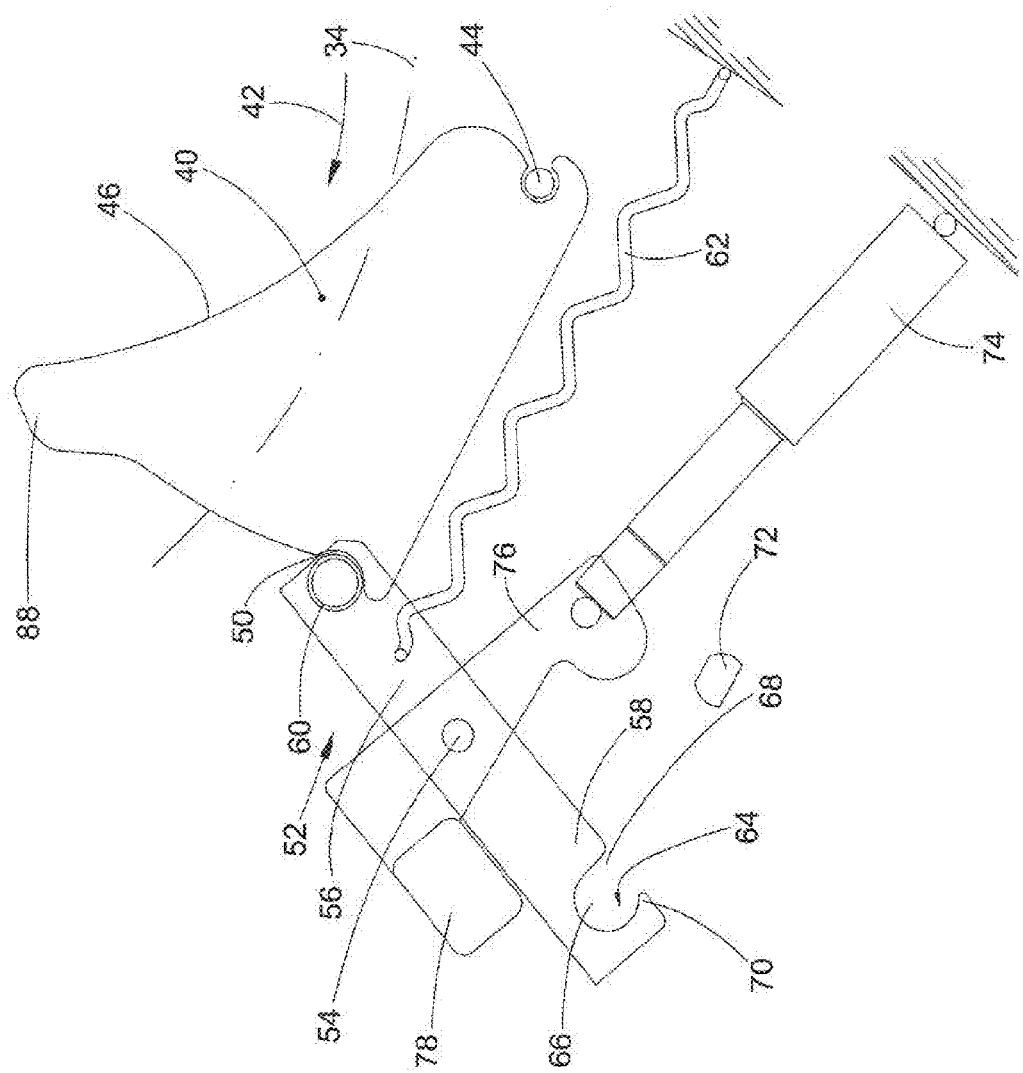
FIG. 4 is a view according to FIG. 3 with the actuator in the second position where the knife is in the active position.
Figure 5:
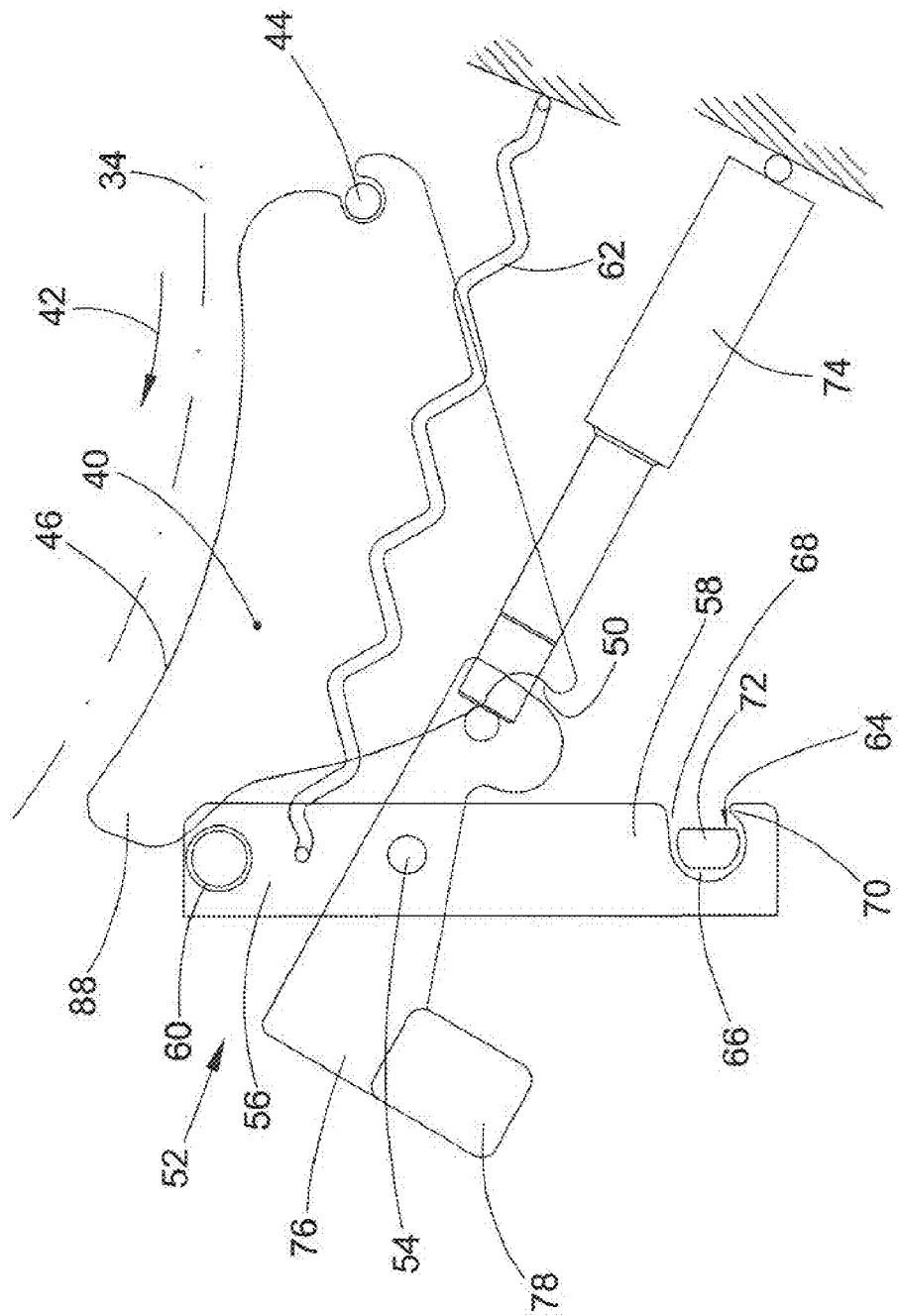
FIG. 5 is a view according to FIG. 3 with the control shaft brought into the blocking position, where the knife is in the inactive position; and, FIG. 6 is a side view of the coupling between the actuator and the control shaft, that prevents an unintentional movement of the control shaft.

Each of the knives 40 corresponds to a lever 52 supported, so as to rotate individually about an axis 54 extending parallel to the pivot axis 44 at the frame or superstructure 12 of the baler 10, and include in each case a first upper arm 56 and a second lower arm 58, the axis 54 is located between these two. The levers 52 consist of U shaped profiles. A roll 60 is fastened on the outer side of the first arm 56 so as to rotate about an axis extending parallel to the axis 54, as can be seen in FIGS. 3 through 5. Each lever 52 is also associated with a spring 62 (see FIGS. 3 through 5) that is supported in joints at one end of its first arm 56 of the lever 52 and connected in joints at its other end to the frame or superstructure 12 of the baler 10, in order to preload the first arm 56 with the role 60 in the direction towards the rear edge 48 of the knife 40, so that the roll 60 is retained in the recess 50. The second arm 58 is equipped with a recess 64 that is composed of a circular opening 66 and a slot 68, that extends from the opening 66 up to the edge of the arm 58 and whose cross section is limited by a nose 70, so that the slot 68 is narrower than the opening 66 as seen in the transverse direction. A control shaft 72 is located outside the opening 66.

Moreover, two actuators 74, actuated by external forces, are used, that are shown schematically in FIGS. 3 through 5, and are connected in joints between the frame or superstructure of the baler 10 and an oscillating crank 76. The oscillating cranks 76 are also supported in bearings so as to rotate about the axis 54 and furthermore are connected with a beam 78 on the side of the actuator 74 that is located on the side spaced away from the breakthrough 68 of the second arm 58. The beam 78 extends over the width of the cutter head. An actuator 74 and an oscillating crank 76, in each case, are provided at each end of the cutter head and are connected With the beam 78 at that location. The actuator 74 can be forced from a first position, in which they force the beam 78 against the lever 52, and rotate the lever 52 about the axis 54 relative to the figures in the counterclockwise direction, so that the control shaft 72 is located within the opening 66 (see FIG. 3) and can be moved to a second position (see FIGS. 2 and 4 to 6) in which the position of the lever 52 is not affected. The beam 78 can then be in contact with the second arm 58 or it may be spaced away from it.

The control shaft 72 is equipped with flattened areas 80 distributed about its circumference and it's longitudinal direction that interact with the openings 66. The control shaft 72 can be rotated about its longitudinal axis and can be locked in four selected rotary positions, for which purpose a perforated disk 82 is connected with the control shaft 72, that can be connected by a splint or a pin with the frame or superstructure 12 of the baler 10, in order to secure the control shaft in the selected position.

FIG. 6 shows a mechanical coupling 82, that prevents the control shaft 72 from being rotated when the actuators 74 are in the second position. The coupling 82 is a sheet metal part connected rigidly with the beam 78 and/or the oscillating crank 76, with a first part 84 in the form of a circular hole and a second part 86 in the form of an elongated hole, that opens to the right, in order to simplify the assembly. The control shaft 72, in its area interacting with the coupling 82, is provided with a flat four-sided section. The result thereby is that the control shaft 72 cannot be rotated when the actuators 74 are in their second position, because then the square section of the control shaft 72 is in contact with the second part 86. If, on the other hand, the actuators 74 are brought into their first position, then the control shaft 72 is located within the circular, first part 84 and can be rotated without any problem and can be locked in the selected position by means of the aforementioned splints or pins.

On the basis of the above, the result is the following operation of the mechanism for the selection of the length of cut of the cutter head.

In order to select the number of knives 40 that are to be inserted into the channel 36, the operator induces the actuators 74 to be supplied with pressurized hydraulic fluid. For this purpose a connection with the on-board hydraulic system of the tractor towing the baler 10 or a separate hydraulic supply for the baler 10 itself is provided, that is connected with the actuator 74 by a valve with the piston chamber of the single acting hydraulic cylinder. The valve can also be controlled remotely from the operator's work station of the tractor. Therefore the result is that the beam 78 brings all levers 52 into the non-operating position shown in FIG. 3. Since then the rolls 60 are no longer in the associated recesses 50, the knives 40 fall downward about the pivot axis 44 into the inactive position on the basis of the force of gravity and/or the force of the flowing harvested crop, in which they are no longer located in the channel 36 and do not apply any cutting effect to the harvested crop. An upper nose 88 on the upper side of the rear edge 48 of the knives 40 is then in contact with the roll 60 and prevents any further lowering of the knife 40.

Since the control shaft 72 is now Within the first part 84 of the coupling 82, the control shaft 72 can now be rotated into any one of the four possible positions, which can be performed manually or by means of an actuator actuated by external forces (not shown), which can be performed from the operator's station on the tractor. In a possible embodiment, the four positions of the control shaft are associated with the following number of knives: 7, 12, 13, and 25, where the total number of knives 40 is 25. If no knives 40 at all are to be activated the actuator remains in the second position, as is shown in FIG. 3. The election of 12 or 13 knives 40 permits the alternative use of the knives 40 so that its wear can be uniform by an alternating application of the knives 40. Thereby three lengths of cut can be selected.

After the control shaft 72 has been brought into the desired position, the actuators 74 are again brought in to the second position, in which the hydraulic fluid is drained out of the piston chamber into a tank by means of an appropriate valve. It would also be conceivable to configure the actuators 74 as double acting hydraulic cylinders and to supply pressurized hydraulic fluid to their piston rod chambers in case that the return force of the springs 62 should not be adequate. The springs 62 of the levers 52 of the knives 40 selected for the active position (and if necessary, the double-acting actuators 74) then bring the actuators 74 and the beam 78 into the second position, as is shown in the FIGS. 2 and 4 though 6.

The flat areas 80 of the control shaft 72 and the recesses 64 in the levers 52 with circular openings 66 the penetrations 68 and the noses 70 are dimensioned in such a way that the levers 52 of the knives 40, selected for the active position, are not retained by the control shaft 72 so that the levers 52 can be freely pivoted in the clockwise direction by the force of the associated springs 62 about the axis 54. At that time the roll 60 slides along the rear edge 48 of the knife 40 and pivots it about the pivot axis 44 into the active- position, in which it extends into the channel 36, as is shown in FIG. 4. In case that a foreign object, for example, a stone, is picked up, the knife 40 forces the roll 60 out of the recess 50, so that the knife 40 then automatically reaches the inactive position and damage to the knife 40 is prevented.

Moreover, the flattened areas 80 of the control shaft 72 and the recesses 64 in the levers 52 with the circular openings 66 of the slot 68 and the noses 70 are dimensioned in such a way that the levers 52 of the knives 40 not selected for the active position are retained by the control shaft 72 so that the levers 52 cannot be pivoted about the axis 54 in the clockwise direction by the force of the associated springs 62. The levers (52) of the knives (40) not selected for the active position therefore remain the non-operating position, as shown in FIG. 5, since they are retained there by the control shaft (72).

In conclusion it should be noted that the actuators (74) could also be replaced by an arrangement manually actuated by an operator, so that the outside force is made available by the operator, for example, by means of a hand crank and an appropriate reduction gear ratio.

Having described the preferred embodiment, it will become apparent that various modifications can be made without departing from the scope of the invention as defined in the accompanying claims.

The invention claimed is:

1. A cutter head for stalk-like agricultural harvested crop, having:
   a number of knives arranged alongside each other transverse to a channel through which harvested crop can flow and connected in joints, free to pivot about a pivot axis arranged transverse to the channel;
   levers associated with the knives are supported, free to pivot, and can be moved between an operating position, in which they retain the knives associated with them, in an active position where the knife extends into the channel and a non-operating position where the knife is not in an active position;
   springs associated with each lever pre-load the lever into the operating position; and,
   a control shaft extends parallel to the pivot axis and interacts with the levers for the selection of the length of cut via selection of partial numbers of the knives to be brought into the active position;
   wherein an actuator, selectively moves between a first position in which all levers are brought into the non-operating position and a second position in which the levers can reach the operating position, and the control shaft retains the levers of the knives in each case not selected, in the non-operating position, so that only the selected knives reach the active position by the actuator located in the second position due to the action of the springs.

2. A cutter head according to claim 1, wherein the control shaft is rotatable about its longitudinal axis.

3. A cutter head according to claim 1, wherein a coupling between the actuator and the control shaft, permits a movement of the control shaft only when the actuator is in the first position.

4. A cutter head, according to claim 3, wherein the coupling is coupled to the actuator and is equipped with a first part and a second part, where the first part does not limit the movement of the control shaft when the actuator is in the first position, and the second part prevents the movement of the control shaft when the actuator is in the second position.

5. A cutter head according to claim 4, wherein the first part of the coupling is provided with a dimension that is greater than a diameter of an enveloping circle of the control shaft, while the second part is an elongated hole, in which a flattened region of the control shaft can be accommodated.

6. A cutter head according to claim 1, wherein the levers include a first and a second arm, the first arm being in contact with the first side of the axis and the second arm being in contact with the other side of the axis and the first arm interacting with the knife, while the second arm interacts with the actuator.

7. A cutter head according to claim 6, wherein the control shaft interacts with the second arm.

8. A cutter head according to claim 1, wherein the control shaft includes flattened areas that interact with recesses in the lever, and the recesses are shaped in such a way that the recesses can be guided away from the control shaft only at a predetermined position of the control shaft.

9. A cutter head according to claim 1, wherein the control shaft is provided with a total of four control positions.

10. A cutter head according to claim 9, wherein all knives are in the active position in a first position of the control shaft, and in a second and third control position alternately in each case approximately one half of the knives are in an active position, and in the fourth control position of the control positions approximately one third of the knives are in the active position.

11. A cutter head according to claim 1, wherein the actuator is connected, so as to drive a beam extending transverse to the channel and interacts with the levers.

12. A cutter head according to claim 11, wherein actuators are arranged at both ends of the beam.

13. A cutter head according to claim 11, wherein the actuator is connected via an oscillating crank with the beam and can be pivoted about the axis of the lever.

* * * * *